United States Patent
Mun et al.

(10) Patent No.: US 11,694,441 B2
(45) Date of Patent: Jul. 4, 2023

(54) ELECTRONIC DEVICE CORRECTING META INFORMATION OF IMAGE AND OPERATING METHOD THEREOF

(71) Applicant: Samsung Electronics Co., Ltd., Gyeonggi-do (KR)

(72) Inventors: Jinho Mun, Gyeonggi-do (KR); Hyunwoo Kim, Gyeonggi-do (KR); Mihwa Park, Gyeonggi-do (KR); Sungdeuk Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/529,398

(22) Filed: Nov. 18, 2021

(65) Prior Publication Data

US 2022/0156498 A1    May 19, 2022

Related U.S. Application Data (63) Continuation of application No. PCT/KR2021/016818, filed on Nov. 17, 2021.

(30) Foreign Application Priority Data

Nov. 19, 2020 (KR) .................. 10-2020-0155585

(51) Int. Cl.
*G06V 20/30* (2022.01)
*G06V 20/00* (2022.01)
(Continued)

(52) U.S. Cl.
CPC .............. *G06V 20/35* (2022.01); *G06V 20/30* (2022.01); *H04N 23/631* (2023.01); *H04N 23/80* (2023.01)

(58) Field of Classification Search
CPC .......... G06T 7/521; G06T 2207/30268; G06K 9/6256; G06K 9/6289; G06V 10/143;
(Continued)

(56) References Cited

U.S. PATENT DOCUMENTS 8,417,000 B1    4/2013   Mendis
8,718,373 B2    5/2014   Mendis
(Continued)

FOREIGN PATENT DOCUMENTS

KR    10-2010-0052676 A    5/2010
KR    10-1459522 B1    11/2014
(Continued)

OTHER PUBLICATIONS

International Search Report dated Mar. 3, 2022.

*Primary Examiner* — Stephen P Coleman
(74) *Attorney, Agent, or Firm* — Cha & Reiter, LLC (57) ABSTRACT

Disclosed is an electronic device which includes a processor, and a memory that stores instructions and at least one images. The instructions, when executed by the processor, cause the electronic device to: classify the at least one images into at least one image group, based on meta information of the at least one image; identify tag information about at least one object of first images in a first image group of the at least one image group; identify place information about the first images, based on the tag information; and correct meta information of the first images, based on the identified place information.

20 Claims, 6 Drawing Sheets

(51) Int. Cl.
*H04N 23/80* (2023.01)
*H04N 23/63* (2023.01)

(58) Field of Classification Search
CPC .... G06V 20/593; G06V 20/64; G06V 10/141; G06V 10/145; G06V 10/764; G06V 10/803; G06V 20/10; G06V 40/103; H04N 5/2226; H04N 13/254; H04N 13/271; H04N 5/2256; G01B 11/25
USPC .......................................................... 382/103
See application file for complete search history.

(56) References Cited

U.S. PATENT DOCUMENTS

| | | | |
|---|---|---|---|
| 9,189,707 B2 | 11/2015 | Brown | |
| 9,203,981 B2 | 12/2015 | Minamino et al. | |
| 9,344,841 B2 | 5/2016 | Yu et al. | |
| 9,582,738 B2 | 2/2017 | Brown | |
| 9,613,060 B2 | 4/2017 | Choi et al. | |
| 10,194,036 B2 | 1/2019 | Minamino et al. | |
| 10,360,479 B2 | 7/2019 | Kim et al. | |
| 10,558,896 B2 | 2/2020 | Kim et al. | |
| 2008/0090607 A1* | 4/2008 | Kraft | H04N 1/3871 455/556.1 |
| 2010/0121852 A1 | 5/2010 | Kim | |
| 2015/0371114 A1 | 12/2015 | Brown, Jr. | |
| 2016/0188647 A1* | 6/2016 | Chang | G06F 16/122 707/805 |

FOREIGN PATENT DOCUMENTS

| | | |
|---|---|---|
| KR | 10-1601726 B1 | 3/2016 |
| KR | 10-2016-0049411 A | 5/2016 |
| KR | 10-2016-0111756 A | 9/2016 |
| KR | 10-2017-0055254 A | 5/2017 |
| KR | 10-2113969 B1 | 5/2020 |

\* cited by examiner

| PHOTOGRAPHING TIME | LOCATION INFORMATION ||
|---|---|---|
| | LATITUDE | LONGITUDE |
| 11:12 | 37.2664440 | 126.9972137 |
| 11:12 | 37.1458143 | 126.0649310 |
| 11:13 | 37.2664440 | 126.9972137 |
| 11:14 | 37.2664440 | 126.9972137 |
| 13:34 | 37.5088652 | 127.0609550 |
| 13:37 | 37.5088652 | 127.0609550 |
| 14:59 | 37.5555182 | 126.9694040 |
| 14:59 | 37.5555182 | 126.9694040 |

ELECTRONIC DEVICE CORRECTING META INFORMATION OF IMAGE AND OPERATING METHOD THEREOF

CROSS REFERENCE TO RELATED APPLICATION

This application is a Continuation of International Application No. PCT/KR2021/016818 filed on Nov. 17, 2021, which claims the benefit under 35 U.S.C. § 119(a) of a Korean patent application filed on Nov. 19, 2020 in the Korean Intellectual Property Office and assigned Serial No. 10-2020-0155585, the entire disclosure of which is hereby incorporated by reference.

TECHNICAL FIELD

The disclosure relates to an electronic device correcting meta information of an image and an operating method thereof.

BACKGROUND

When storing an image, an electronic device may store meta information about the image together. The meta information may include an image photographing time, a photographing location, camera information, or camera setting information (e.g., a focal length, a flash, an aperture, and a shutter speed).

The photographing location information included in the meta information may be longitude and latitude information of the electronic device when acquiring the image.

Photographing location information included in meta information may be inaccurate. For example, the meta information may be inaccurate when an electronic device is located indoors, underground, where there are many base stations or wi-fi devices in the proximate area or where there is a lot of electromagnetic interference when acquiring an image.

Also, when the electronic device is located in a complex facility (e.g., a department store or an amusement park) when acquiring an image, it may be difficult to accurately determine information about the place where the image is photographed.

It is important that the meta information be accurate.

SUMMARY

According to certain embodiments, an electronic device comprises: a processor; and a memory storing instructions and configured to store at least one image, wherein the instructions, when executed by the processor, cause the electronic device to: classify the at least one image into at least one image group, based on meta information of the at least one image; identify tag information about at least one object of first images in a first image group of the at least one image group; identify place information about the first images, based on the at least one tag information; and correct meta information of the first images, based on the identified place information.

According to certain embodiments, an operating method of an electronic device comprises: classifying at least one image stored in a memory into at least one image group, based on meta information stored with the at least one image; identifying tag information of at least one object of first images included in a first image group of the at least one image group with a processor; identifying place information about the first images, based on the tag information; and correcting meta information of the first images, based on the identified place information.

The effects that are achieved through certain embodiments of the disclosure may not be limited to what has been described herein, and other effects not described herein may be clearly understood from the following detailed description by persons skilled in the art.

BRIEF DESCRIPTION OF DRAWINGS

With regard to description of drawings, the same or similar components will be marked by the same or similar reference signs.

DETAILED DESCRIPTION

According to embodiments of the disclosure, more detailed location information and/or place information may be provided to the user by correcting location information and/or place information of images based on tag information and photographing location information of the images.

The effects that are achieved through certain embodiments of the disclosure may not be limited to what has been described herein, and other effects not described herein may be clearly understood from the following detailed description by persons skilled in the art.

Figure 1:
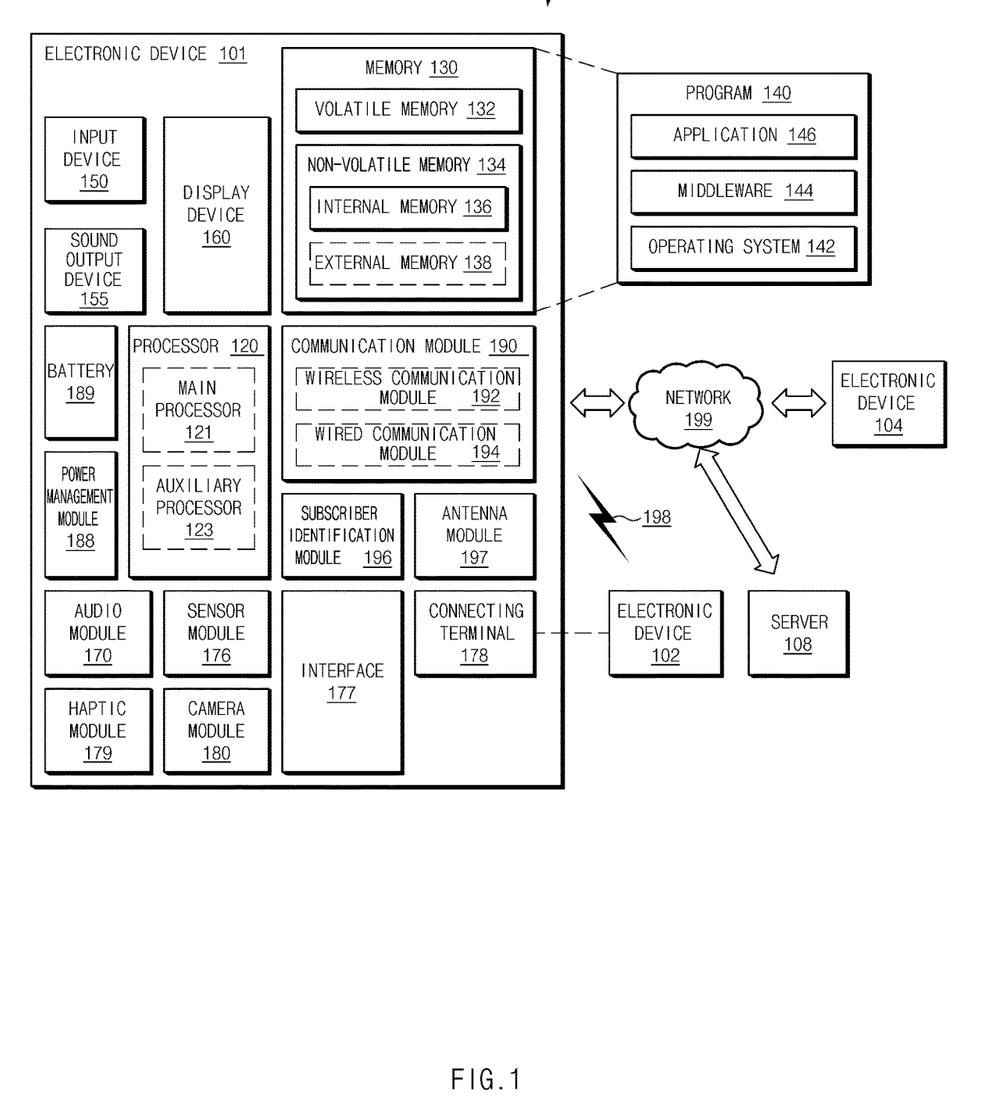
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some of the components (e.g., the sensor module 176, the camera module 180, or the antenna module 197) may be implemented as single integrated circuitry (e.g., the display module 160). The term "processer" shall be understood to refer to both the singular and plural contexts in this disclosure.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit NPU, an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing of an artificial intelligence model. The artificial intelligence model may be created through machine learning. This learning may be performed, for example, automatically by the electronic device 101 in which the artificial intelligence is performed, or may be performed through a separate server (e.g., the server 108). A learning algorithm may include, for example, supervised learning, unsupervised learning, semi-supervised learning, or reinforcement learning, but is not limited to the above examples. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-networks, or one of combinations of two or more thereof, but is not limited to the above examples. Additionally or alternatively, the artificial intelligence model may include a software structure in addition to the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support 5G network and next-generation communication technologies after the 4G network, for example, a new radio (NR) access technology. The NR access technology may support enhanced mobile broadband (eMBB), massive machine type communications (mMTC), or ultra-reliable and low-latency communications (URLLC). The wireless communication module 192 may support, for example, a high-frequency band (e.g., an mmWave band) for the purpose of implementing a high data transfer rate. The wireless communication module 192 may support various technologies for securing performance in a high-frequency band, for example, technologies such as beamforming, massive multiple-input and multiple-output (MIMO), full dimensional MIMO (FD-MIMO), array antenna, analog beam-forming, or large scale antenna. The wireless communication module 192 may support various requirements defined by the electronic device 101, an external electronic device (e.g., the electronic device 104) or a network system (e.g., the second network 199). According to an embodiment, the wireless communication module 192 may support a peak data rate (e.g., 20 Gbps or more) for eMBB implementation, a lost coverage (예: 164 dB or less) for mMTC implementation, or a U-plane latency (e.g., 0.5 ms or less for each of downlink (DL) and uplink (UL) or 1 ms or less in terms of round trip) for URLLC implementation.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., an array antenna). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form an mmWave antenna module. According to an embodiment, the mmWave antenna module may include a printed circuit board, an RFIC that is disposed on or adjacent to a first surface (e.g., a lower surface) of the printed circuit board and supports a specified high-frequency band (e.g., an mmWave band), and a plurality of antennas (e.g., an array antenna) that is disposed on or adjacent to a second surface (e.g., an upper surface or a side surface) of the printed circuit board and transmit or receive a signal in the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, a cloud computing, distributed computing, mobile edge computing (MEC), or client-server computing technology may be used. For example, the electronic device 101 may provide an ultra-low latency service by using the distributed computing or mobile edge computing. In another embodiment, the external electronic device 104 may include an Internet of Things (IoT) device. The server 108 may be an intelligence server using machine learning and/or a neural network. According to an embodiment, the external electronic device 104 or the server 108 may be included in the second network 199. The electronic device 101 may be applied to an intelligence service (e.g., a smart home, a smart city, a smart car, or a healthcare) based on a 5G communication technology and an IoT-related technology.

When the camera module 180 of the electronic device 101 captures an image (or video), the image can be stored in memory 130 along with meta data. The meta data can include the positioning data from the GNSS at the time that the image was captured. However, the positioning data from the GNSS may be inaccurate for a variety of reasons. Accordingly, in certain embodiments, the electronic device 101 corrects the positioning data.

Figure 2:
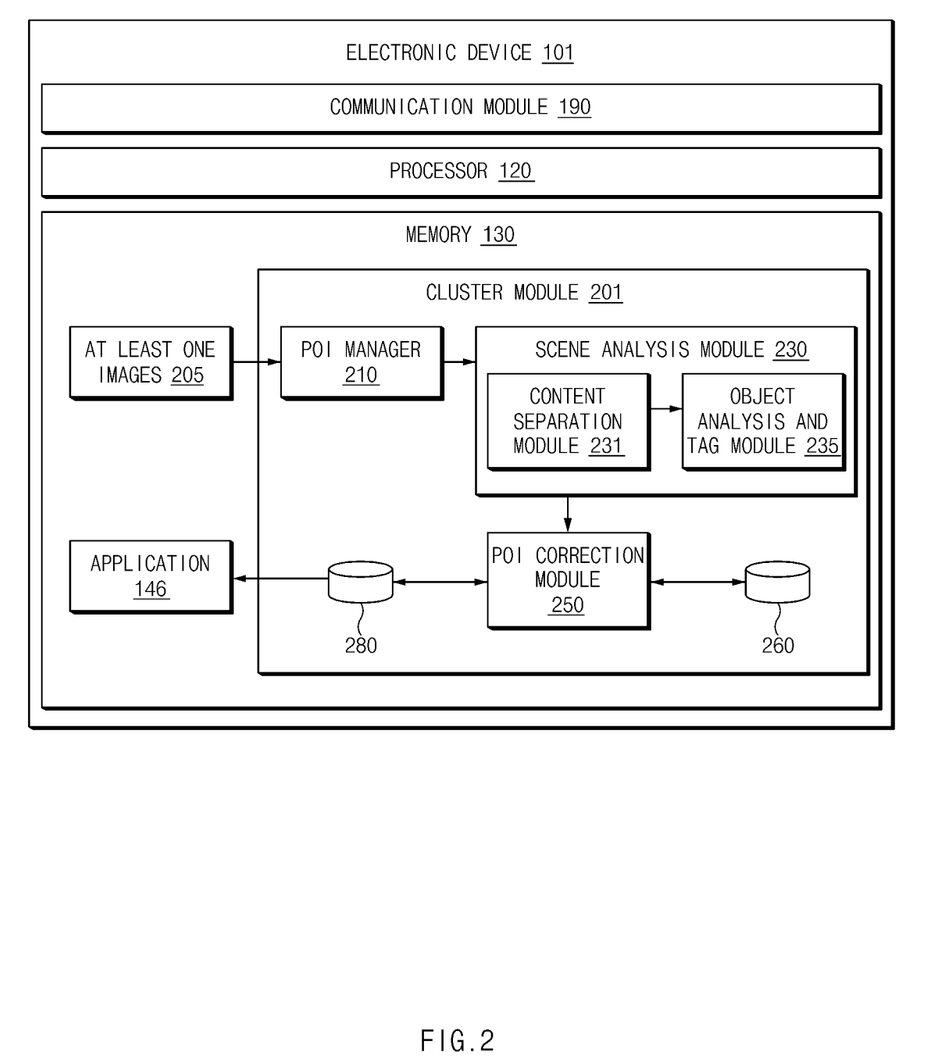
FIG. 2 is a block diagram of an electronic device according to an embodiment.
Figure 3:
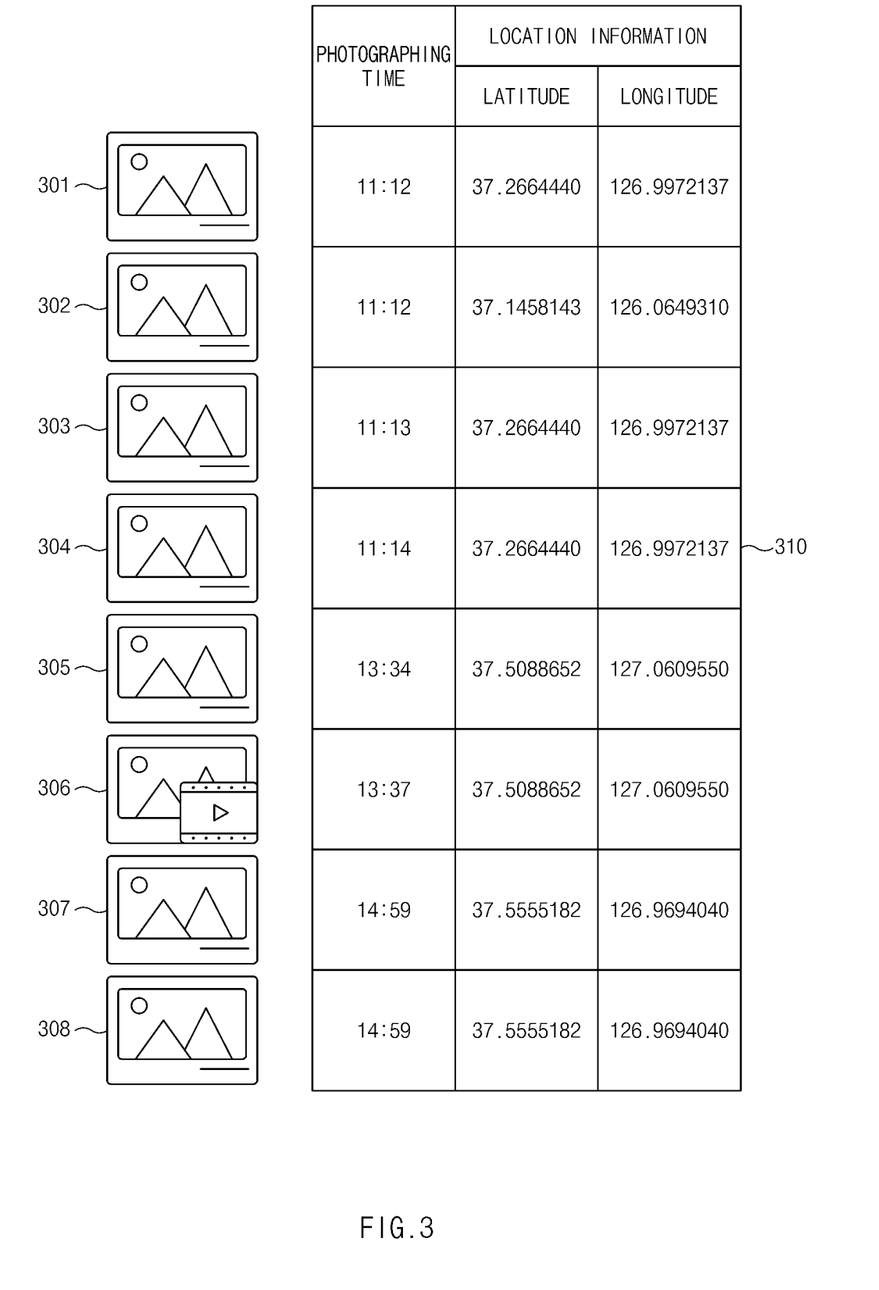
FIG. 3 is a diagram illustrating at least one image and meta data.

The electronic device 101 corrects the positioning data with a cluster module 210. When the images are captured, for example, images 301-308, the images are stored with the time of capture ("Photographing Time"), as well as the latitude and longitude from the GNSS. The photographs are grouped based on time continuity and distance continuity.

Additionally, the object analysis and tag module 235 and content database 280 identifies objects that are in the image. Based on the objects that are in the image, the positioning data can be corrected using a place database 260. The place database 260 includes a listing of place names, with latitude/longitude, and tag information. The tag information can be objects that are likely to be found at named place. For example, if the named place corresponds to a restaurant, the tag information would include food items that are served at the restaurant. If the named place is a beach, the tag information would include a body of water. If the named place is a store, the tag information would include items that are sold at the store.

The positioning data from GNSS can be used to find entries in the place database 260 that are proximate. Then, based at least in part on a comparison of the objects that are identified in the image and objects that are in the tag information of the place in the place database 260, the positioning data can be corrected. For example, an image can include a plate and a food item, and the place database 260 includes a beach, a hotel, and a restaurant that are close to the positioning data of the image. Where the restaurant tag information includes a similar object, the electronic device 101 can correct the positioning data to the location information of the restaurant.

In certain embodiments, all of the objects from images that have both time and distance continuity can be compared as a set to the tag information from the place database 260 to determine and correct the location of all of the images together as a unit.

Figure 4:
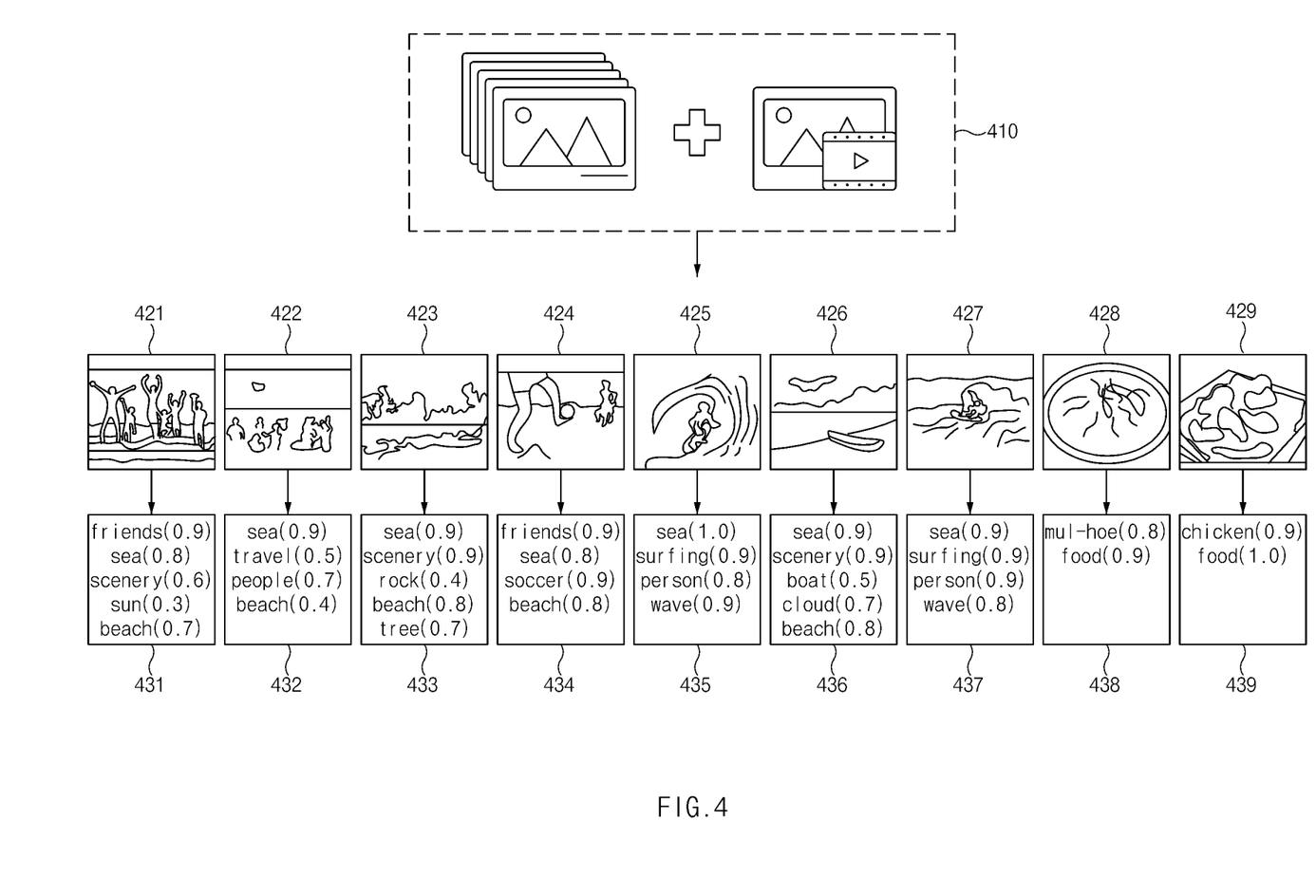
FIG. 4 is a diagram illustrating tagging for an image group.
Figure 5:
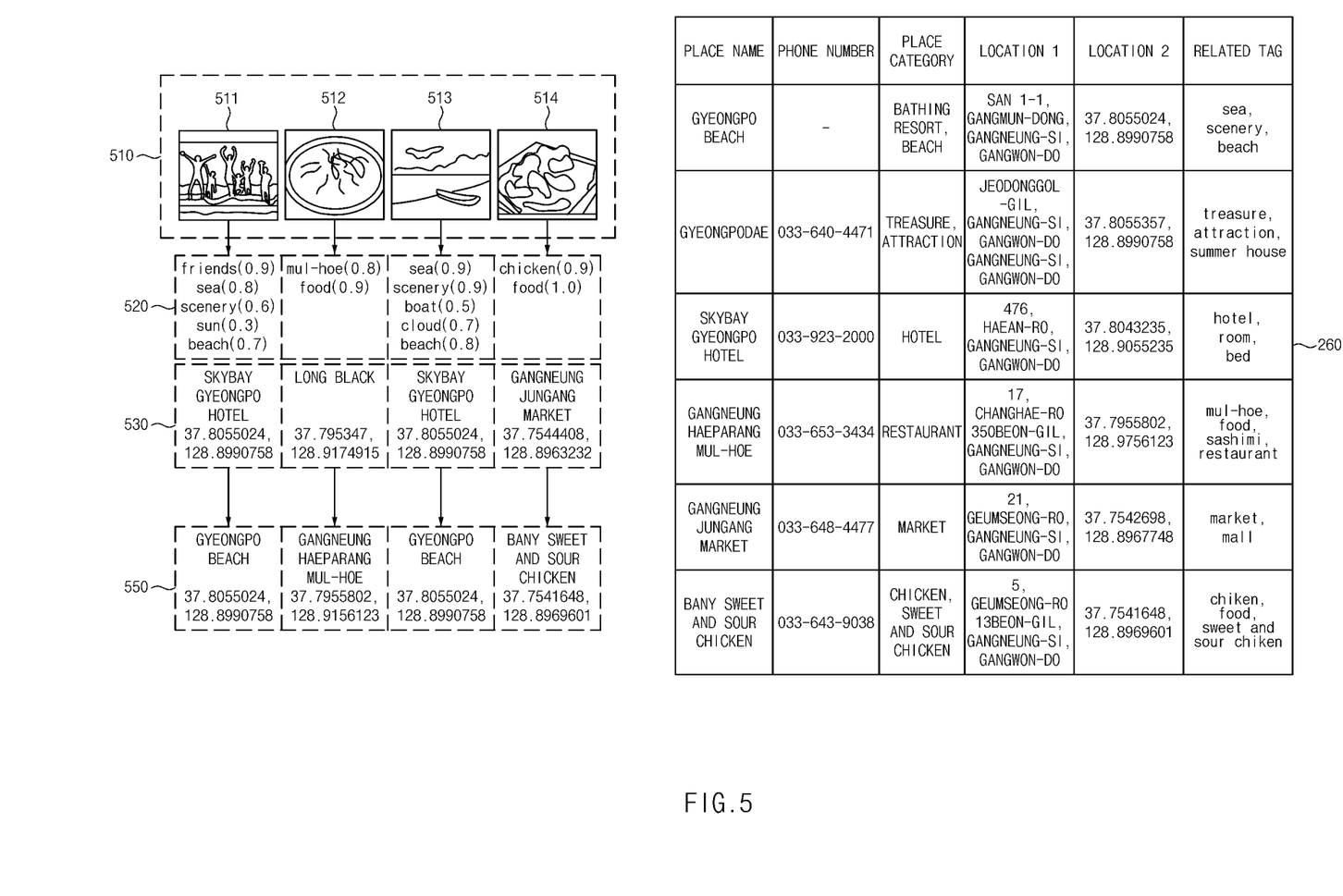
FIG. 5 is a diagram illustrating correction of place information about images included in an image group.

FIG. 2 is a block diagram of the electronic device 101 according to an embodiment. FIG. 3 is a diagram illustrating at least one image 301 to 308 and meta data 310. FIG. 4 is a diagram illustrating tagging for an image group 410. FIG. 5 is a diagram illustrating correction of place information about images 511 to 514 included in an image group 510. The image group 510 of FIG. 5 may correspond to the image group 410 of FIG. 4. The images 511 to 514 included in the image group 510 of FIG. 5 may be some of images 421 to 429 included in the image group 410 of FIG. 4.

The electronic device 101 of FIG. 2 may correspond to the electronic device 101 of FIG. 1.

Referring to FIG. 2, the electronic device 101 may include the processor 120, the memory 130, the communication circuit 190, or a combination thereof. The processor 120, the memory 130, or the communication circuit 190 of FIG. 2 may correspond to the processor 120, the memory 130, or the communication circuit 190 of FIG. 1.

The memory 130 may store a point of interest (POI) manager 201, at least one image 205 ("image" as used herein shall be understood to refer to both a still image as well as a video), and the application 146.

The POI manager 201 and the application 146 may be a program (e.g., the program 140 of FIG. 1) executable by the processor 120. The application may comprise a plurality of instructions that are executable by the processor 120, that cause the processor 120 to perform certain operations when executed by the processor 120.

The POI manager 201 may include a cluster module 210, a scene analysis module 230, a POI correction module 250, or a combination thereof. The POI manager 201 may include a place database 260, a content database 280, or a combination thereof. The scene analysis module 230 may include a content separation module 231 and an object analysis and tag module 235.

The place database 260 may include information about places (hereinafter referred to as "place information"). For example, the place information may include a place name, location, category, tag information matched with the place category, or a combination thereof. The location can be latitude and a longitude. The place category can be, for example, a resort, beach, a tourist attraction, a hotel, a restaurant, or a market.

The POI manager 201 or the place database 260 may be separately implemented in an external server (e.g., the server 108 of FIG. 1).

The content database 280 may be a database for managing information about content (e.g., a still image or a video) stored in the electronic device 101. For example, the content may include the at least one image 205. Information about the content may include meta information of the content.

The processor 120 may execute instructions of the POI manager 201.

The processor 120 may classify the at least one image 205 through the cluster module 210 of the POI manager 201.

The processor 120 may classify the at least one image 205 as at least one image group (or cluster). The processor 120 may classify the at least one image 205 based on meta information of the at least one image 205. The processor 120 may classify the at least one image 205 based on continuity (e.g., time continuity or distance continuity) of the at least one image 205.

The processor 120 may classify images having the time continuity (or being taken within a period of time from each other) from among the at least one image 205 as the same image group. The time continuity between images may be identified based on photographing time information, or time stamp, of meta data of the images.

Among the at least one image 205, images belonging to a specified time range (e.g., 1 hour, or 10 minutes) may be identified as having the time continuity. Alternatively, images in which the amount of dispersion (e.g., a standard deviation) of photographing times is within a specified amount of dispersion may be identified as having the time continuity. In an embodiment, an image having a photographing time within a specified sigma from an average photographing time of images included in an arbitrary image group (e.g., having a photographing time within 3 sigma from the average photographing time) may be identified as having the time continuity with the images included in the arbitrary image group.

In certain embodiments, the time threshold can be varied based on the user's camera usage. For example, if the user frequently takes pictures, a shorter threshold can be used, as compared to a user that infrequently takes pictures. In certain embodiments, a clustering algorithm can identify pictures that are taken in time clusters.

Referring to Table 310 meta information about the images 301 to 308 of FIG. 3 is summarized. The images 301 to 304 of the images 301 to 308 may be evaluated as having the time continuity with each other because they are all taken between 11:10 am and 11:20 am. It is noted however, that the time threshold can be different. The images 305 and 306 of the images 301 to 308 may be evaluated as having the time continuity with each other because they are taken between 1:30 pm and 1:40 pm. Finally, the images 307 and 308 of the images 301 to 308 may be evaluated as having the time continuity with each other because they are taken between 2:50 pm and 3 pm.

The processor 120 may classify images having the distance continuity from among the at least one image 205 as the same image group. The distance continuity between images may be identified based on location information of meta data of the images. In an embodiment, location information may be composed of latitude information and longitude information.

Images within a specified distance (e.g., 500 meters (m)) from among the at least one image 205 may be identified as having the distance continuity. Among the at least one image 205, images in which the amount of dispersion of photographing places is the specified amount of dispersion or less may be identified as having the time continuity. An image having location information within a specified sigma from an average photographing location of images included in an arbitrary image group may be identified as having the distance continuity with the images included in the arbitrary image group.

Referring to Table 310 in which the meta information about the images 301 to 308 of FIG. 3 are summarized, the images 301, 303, and 304 of the images 301 to 304 having the time continuity may be evaluated as having the distance continuity with each other. However, considering a distance difference according to a latitude and a longitude, the image 302 of the images 301 to 304 having the time continuity may be evaluated as not having distance continuity with the images 301, 303, and 304. The images 305 and 306 having the time continuity may be evaluated as having the distance continuity with each other. Finally, the images 307 and 308 having the time continuity may be evaluated as having the distance continuity with each other.

The processor 120 may analyze scenes of the images 421 to 429 with the scene analysis module 230.

The processor 120 may align the images 421 to 429 with the content separation module 231. The processor 120 may perform alignment in the temporal order (the order of capturing or photographing). The processor 120 may align frames of a moving image among the images 421 to 429 in a time sequence.

The processor 120 may identify at least one object included in the aligned images 421 to 429 through the object analysis and tag module 235. The at least one object that are identified as included in at least one of the images 421 to 429 can be included in the respective images tag information 431-439.

The tag information 431 to 439 may include information about a name of the identified object and the confidence level of the identified object. The confidence level may be the probability that the object identified from the images 421 to 429 is actually an object in the image.

Referring to FIG. 4, at least one object identified from the image 421 may be "friends", "sea", "scenery", "sun", and "beach", and the accuracy of the at least one object identified from the image 421 may be 0.9, 0.8, 0.6, 0.3, and 0.7. Here, that the accuracy associated with "sea" from the image 421 is 0.8, that may mean that the probability that the "sea" is actually in the image 421 is 0.8 (or 80%) and the probability that the "sea" is not in the image 421 is 0.2 (20%).

The processor 120 may identify photographing locations (e.g., a latitude and a longitude) of the images 511 to 514 by using the POI correction module 250.

The processor 120 may correct the photographing locations of the images 511 to 514 by comparing tag information 520 and place information 530 (e.g., a place name and location information) of the images 511 to 514 with the place database 260.

The processor 120 may identify at least one photographing locations on the place database 260, based on the place information 530 (e.g., a place name and location information) of the images 511 to 514. The processor 120 may identify at least one candidate locations within a given distance from the location information. The at least one candidate location can be identified according to the place information 530. The processor 120 may identify (at least one) candidate location(s) having high association with the place information 530 of the images 511 to 514. The degree of association between an image and a candidate location may be identified as being higher when the difference of location information (e.g., a latitude and a longitude) becomes smaller.

Referring to FIG. 5, the processor 120 may identify candidate location(s) (e.g., a location of Gyeongpo Beach, a location of Gyeongpodae, and a location of Skybay Gyeongpo Hotel) from the place database 260, based on place information (i.e., latitude: "37.8055024" and longitude: "128.8990758") of the image 511.

The processor 120 may identify a location of Gangneung Haeparang Mul-hoe from the place database 260, based on latitude: "37.795347" and longitude: "128.9174915" of the image 512.

The processor 120 may identify a location of Gyeongpo Beach, a location of Gyeongpodae, and a location of Skybay Gyeongpo Hotel based on latitude: "37.8055024" and longitude: "128.8990758" of the image 513.

The processor 120 may identify a location of Gyeongpo Beach, a location of Gyeongpodae, and a location of Skybay Gyeongpo Hotel from the place database 260, based on latitude: "37.7544408" and longitude: "128.8963232" of the image 514.

The processor 120 may identify a photographing location of the images 511 to 514. The photographing location may be among the (at least one) candidate locations. The candidate locations are based on the tag information 520 of the images 511 to 514. The processor 120 may identify the photographing location of the images 511 to 514 by comparing tag information of the candidate location(s) and the tag information 520 of the images 511 to 514. The processor 120 may identify a candidate location, which includes tag information that most matches the tag information 520 of the images 511 to 514. The processor 120 may identify a candidate location having the high association with the tag information 520 of the images 511 to 514 as the photographing location of the images 511 to 514. The processor 120 may identify a candidate location, which is associated with the tag information 520 of the images 511 to 514 with specified accuracy (e.g., 0.5) or higher of the images 511 to 514, from among the at least one candidate locations as the photographing location of the images 511 to 514. The degree of association between an image and candidate locations may be identified as being higher as the number of matched tags increases.

Referring to FIG. 5, the processor 120 may identify a photographing location (e.g., a location of Gyeongpo Beach) of the image 511 among the at least one candidate locations (e.g., a location of Skybay Gyeongpo Hotel, a location of Gyeongpodae, and a location of Gyeongpo Beach) based on tag information of the image 511, that is, "friends", "sea", "scenery", "sun", and "beach". The processor 120 may identify a location of Gyeongpo Beach, which most matches tag information (i.e., "friends", "sea", "scenery", "sun", and "beach") of the image 511 among tag information (i.e., "hotel", "room", and "bed") of Skybay Gyeongpo Hotel, tag information (i.e., "treasure", "attraction", and "summer house") of Gyeongpodae, and tag information (i.e., "sea", "scenery", and "beach") of Gyeongpo Beach, as a photographing location of the image 511.

The processor 120 may identify a photographing location (e.g., a location of Gyeongpo Beach) of the image 511 among the at least one candidate locations (e.g., Gyeongpo Beach, Gyeongpodae, and Skybay Gyeongpo Hotel), based on tag information (i.e., "friends", "sea", and "beach") of specified accuracy (e.g., 0.7) or higher of the image 511. The processor 120 may identify a location of Gyeongpo Beach, which most match tag information (i.e., "friends", "sea", and "beach") of the specified accuracy (e.g., 0.7) or higher of the image 511 among the tag information (i.e., "hotel", "room", and "bed") of Skybay Gyeongpo Hotel, the tag information (i.e., "treasure", "attraction", and "summer house") of Gyeongpodae, and the tag information (i.e., "sea", "scenery", and "beach") of Gyeongpo Beach, as a photographing location of the image 511.

The processor 120 may identify a photographing location (e.g., a location of Gangneung Haeparang Mul-hoe) of the image 512 among the at least one candidate locations (e.g., Gangneung Haeparang Mul-hoe, and Bany Sweet and Sour Chicken), based on tag information (i.e., "mul-hoe" and "food") of the image 512. The processor 120 may identify a location of Gangneung Haeparang Mul-hoe, which most matches tag information (i.e., "mul-hoe" and "food") of the image 512 among tag information (i.e., "mul-hoe", "food", "sashimi", and "restaurant") of Gangneung Haeparang Mul-hoe and tag information (i.e., "chicken", "food", and "sweet and sour chicken") of Bany Sweet and Sour Chicken, as a photographing location of the image 512.

The processor 120 may identify a photographing location (e.g., a location of Gangneung Haeparang Mul-hoe) of the image 512 among at least one photographing candidates (e.g., Gangneung Haeparang Mul-hoe, and Bany Sweet and Sour Chicken), based on tag information (i.e., "mul-hoe" and "food") of specified accuracy (e.g., 0.7) or higher of the image 512. The processor 120 may identify a location of Gangneung Haeparang Mul-hoe, which most matches tag information (i.e., "mul-hoe" and "food") of the specified accuracy (e.g., 0.7) or higher of the image 512 among the tag information (i.e., "mul-hoe", "food", "sashimi", and "restaurant") of Gangneung Haeparang Mul-hoe and the tag information (i.e., "chicken", "food", and "sweet and sour chicken") of Bany Sweet and Sour Chicken, as a photographing location of the image 512.

The processor 120 may identify a photographing location (e.g., a location of Gyeongpo Beach) of the image 513 among the at least one candidate locations (e.g., Gyeongpo Beach, Gyeongpodae, and Skybay Gyeongpo Hotel), based on tag information (i.e., "sea", "scenery", "boat", "cloud", and "beach") of the image 513. The processor 120 may identify a location of Gyeongpo Beach, which most match tag information (i.e., "sea", "scenery", "boat", "cloud", and "beach") of the image 513 among the tag information (i.e., "hotel", "room", and "bed") of Skybay Gyeongpo Hotel, the tag information (i.e., "treasure", "attraction", and "summer house") of Gyeongpodae, and the tag information (i.e., "sea", "scenery", and "beach") of Gyeongpo Beach, as a photographing location of the image 513.

The processor 120 may identify a photographing location (e.g., a location of Gyeongpo Beach) of the image 513 among the at least one candidate locations (e.g., Gyeongpo Beach, Gyeongpodae, and Skybay Gyeongpo Hotel), based on tag information (i.e., "sea", "scenery", "cloud", and "beach") of specified accuracy (e.g., 0.7) or higher of the image 513. The processor 120 may identify a location of Gyeongpo Beach, which most match tag information (i.e., "sea", "scenery", "cloud", and "beach") of the specified accuracy (e.g., 0.7) or higher of the image 513 among the tag information (i.e., "hotel", "room", and "bed") of Skybay Gyeongpo Hotel, the tag information (i.e., "treasure", "attraction", and "summer house") of Gyeongpodae, and the tag information (i.e., "sea", "scenery", and "beach") of Gyeongpo Beach, as a photographing location of the image 513.

The processor 120 may identify a photographing location (e.g., a location of Bany Sweet and Sour Chicken) of the image 514 among the at least one candidate locations (e.g., Gangneung Haeparang Mul-hoe, and Bany Sweet and Sour Chicken), based on tag information (i.e., "chicken" and "food") of the image 514. The processor 120 may identify a location of Bany Sweet and Sour Chicken, which most matches tag information (i.e., "chicken" and "food") of the image 514 among tag information (i.e., "market" and "mall") of Skybay Gangneung Jungang Market, the tag information (i.e., "mul-hoe", "food", "sashimi", and "restaurant") of Gangneung Haeparang Mul-hoe, and the tag information (i.e., "chicken", "food", and "sweet and sour chicken") of Bany Sweet and Sour Chicken, as a photographing location of the image 514.

The processor 120 may identify a photographing location (e.g., a location of Bany Sweet and Sour Chicken) of the image 514 among at least one photographing candidates (e.g., Gangneung Jungang Market, Gangneung Haeparang Mul-hoe, and Bany Sweet and Sour Chicken), based on tag information (i.e., "chicken" and "food") of specified accuracy (e.g., 0.7) or higher of the image 514. The processor 120 may identify a location of Bany Sweet and Sour Chicken, which most matches tag information (i.e., "chicken" and "food") of the specified accuracy (e.g., 0.7) or higher of the image 514 among the tag information (i.e., "market" and "mall") of Skybay Gangneung Jungang Market, the tag information (i.e., "mul-hoe", "food", "sashimi", and "restaurant") of Gangneung Haeparang Mul-hoe, and the tag information (i.e., "chicken", "food", and "sweet and sour chicken") of Bany Sweet and Sour Chicken, as a photographing location of the image 514.

The processor 120 may correct and/or add place information of the images 511 to 514 by using the POI correction module 250 of the POI manager 201. The processor 120 may correct and/or add the place information 530 of the images 511 to 514 based on information on the place database 260 associated with the identified photographing location.

Referring to FIG. 5, the processor 120 may correct a place name of the image 511 from "Skybay Gyeongpo Hotel" to "Gyeongpo Beach", based on information about "Gyeongpo Beach" of the place database 260. The processor 120 may correct location information (e.g., a latitude and a longitude) of the image 511, based on the information about "Gyeongpo Beach" of the place database 260.

Referring to FIG. 5, the processor 120 may correct a place name of the image 512 from "Long Black" to "Gangneung Haeparang Mul-hoe", based on information about "Gangneung Haeparang Mul-hoe" of the place database 260. The processor 120 may correct location information (e.g., a latitude and a longitude) of the image 512, based on the information about "Gangneung Haeparang Mul-hoe" of the place database 260.

Referring to FIG. 5, the processor 120 may correct a place name of the image 513 from "Skybay Gyeongpo Hotel" to "Gyeongpo Beach", based on the information about "Gyeongpo Beach" of the place database 260. The processor 120 may correct location information (e.g., a latitude and a longitude) of the image 513, based on the information about "Gyeongpo Beach" of the place database 260.

Referring to FIG. 5, the processor 120 may correct a place name of the image 514 from "Gangneung Jungang Market" to "Bany Sweet and Sour Chicken", based on information about "Bany Sweet and Sour Chicken" of the place database 260. The processor 120 may correct location information (e.g., a latitude and a longitude) of the image 514, based on the information about "Bany Sweet and Sour Chicken" of the place database 260.

The processor 120 may correct meta information (e.g., place information) of content, based on information of each of the images 511 to 514 corrected through the POI correction module 250.

The processor 120 may access the content database 280 through the application 146. The application 146 may provide a service by using the meta information (e.g., place information) of the content, which is managed in the content database 280.

The processor 120 may provide the user with recommended candidate places having association with the image group 510 in the place database 260 through the application 146.

The processor 120 may identify at least one recommended locations based on information (e.g., location information and/or tag information) of the images 511 to 514 included in the image group 510 in the place database 260 and may display a user interface indicating information (e.g., a place name, a phone number, a place category, and location information) about the recommended locations through the display module 160.

The at least one recommended locations may be places within a specified distance (e.g., 500 meters (m)) from a location at which the images 511 to 514 of the image group 510 are photographed. For example, the processor 120 may display a user interface indicating "Skybay Gyeongpo Hotel" as a recommended location through the display module 160, based on the location information of the images 511 to 514 of the image group 510.

The at least one recommended locations may be places including pieces of tag information matched with pieces of tag information of the images 511 to 514 of the image group 510 as much as the specified number or more. For example, the processor 120 may display a user interface indicating another beach (e.g., Gangmun Beach) as a recommended location through the display module 160, based on the location information of the images 511 to 514 of the image group 510.

The at least one recommended locations may be places that are identified based on a visit history of any other users. The at least one recommended locations may be places that are identified depending on the conditional probability of visiting an arbitrary place when visiting places according to the place information of the images 511 to 514. The conditional probability may be in advance determined based on a visit history of any other users.

The at least one recommended locations may be places (e.g., a coffee shop) that are matched with tag information (e.g., "coffee") extracted in common from images of a plurality of image groups.

The at least one recommended locations may be a location, which the user is able to visit in his/her remaining time (or schedule) in consideration of a schedule (e.g., a hotel reservation schedule and a flight schedule recorded in the electronic device 101) of the user, from among the plurality of recommended candidate locations. The plurality of recommended candidate locations may be place within a specified distance (e.g., 500 meters (m)) from a location at which images included in at least one image group generated within the schedule (e.g., a hotel reservation schedule and a flight schedule recorded in the electronic device 101) of the user are photographed.

The processor 120 may create a story album indicating an image group through the application 146.

In an embodiment, when creating the story album, the processor 120 may select representative images of the story album based on images of a lower image group associated with the image group. In an embodiment, when place information of images included in an image group indicates an upper place (e.g., an amusement park and a department store), the lower image group may be a lower place (e.g., a ride and a stand) associated with the upper place.

In an embodiment, when creating the story album, the processor 120 may determine a name of the story album based on place names of images included in an image group. In an embodiment, a place name of an upper place including place information of images included in an image group may be determined as a name of a story album. In an embodiment, when a place name of images included in an image group is "Gangneung Haeparang Mul-hoe" or "Bony Sweet and Sour Chicken", a name of a story album may be "Gangneung Jungang Market".

As described above, the electronic device 101 according to an embodiment of the disclosure may provide more detailed location information (or place information) to the user by correcting location information of images based on tag information and photographing location information of the images.

As described above, the electronic device 101 according to an embodiment of the disclosure may provide a location-based service to the user based on the detailed location information.

Figure 6:
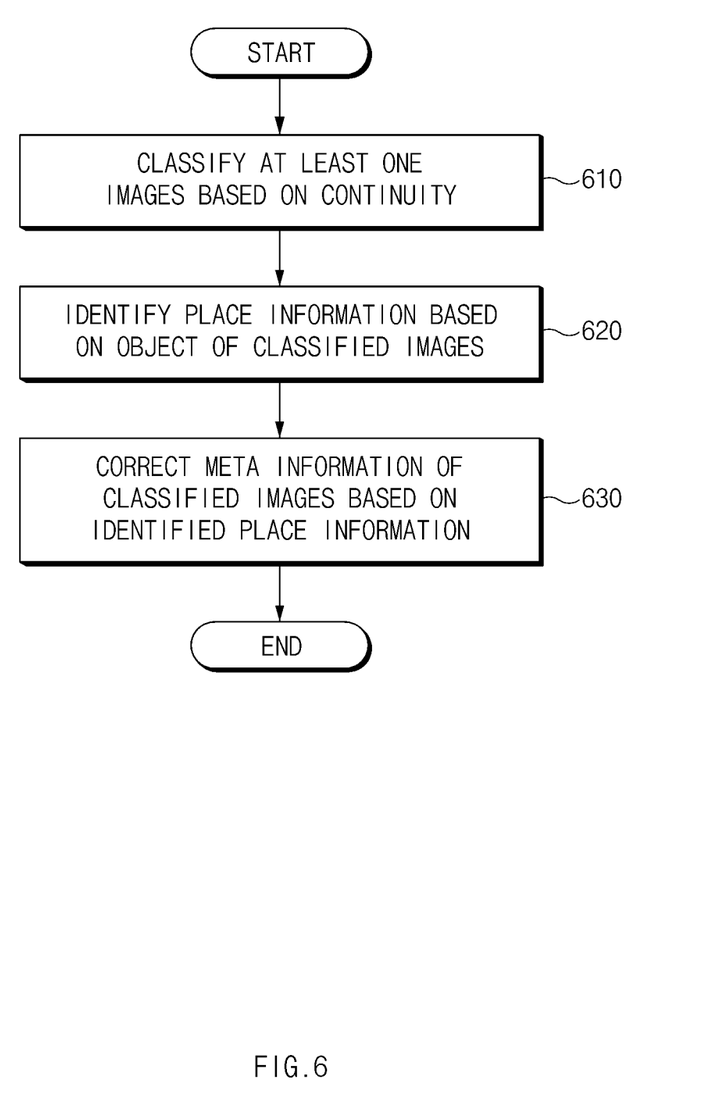
FIG. 6 is a flowchart illustrating an operation of an electronic device according to an embodiment of the disclosure.

FIG. 6 is a flowchart illustrating an operation of the electronic device 101 according to an embodiment of the disclosure.

Referring to FIG. 6, in operation 610, the processor 120 of the electronic device 101 may classify at least one image based on continuity. The processor 120 may classify the at least one image based on meta information of the at least one image.

The processor 120 may classify the at least one image based on continuity (e.g., time continuity or distance continuity) of the at least one image. The time continuity between images may be identified based on photographing time information of meta data of the images. The distance continuity between images may be identified based on location information (e.g., latitude information and longitude information) of meta data of the images.

In operation 620, the processor 120 may identify place information based on an object of the classified images.

The processor 120 may identify an object from images classified as the same group and may identify information about tag information (i.e., a name and accuracy) indicating the identified object. The processor 120 may identify place information based on tag information and location information of the images classified as the same group.

In operation 630, the processor 120 may correct meta information of the classified images based on the identified place information.

The processor 120 may correct and/or add place information of the images classified as the same group. The processor 120 may correct and/or add the place information of the images classified as the same group based on information on the place database 260 associated with the identified place information.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a processor; and
a memory storing instructions and configured to store at least one image,
wherein the instructions, when executed by the processor, cause the electronic device to:

classify the at least one images into at least one image group, based on meta information of the at least one image;

identify tag information about at least one object of first images in a first image group of the at least one image group;

identify place information about the first images, based on the tag information; and correct meta information of the first images, based on the identified place information.

2. The electronic device of claim 1, wherein images respectively classified into the at least one image groups have continuity with each other, and wherein the continuity includes time continuity and/or distance continuity.

3. The electronic device of claim 1, wherein the instructions, when executed by the processor, cause the electronic device to:

identify the place information about the first images based on tag information having at least a specified confidence.

4. The electronic device of claim 1, wherein the meta information includes a place name, a location, a place category, tag information matched with the place category, or a combination thereof.

5. The electronic device of claim 1, wherein the instructions, when executed by the processor, cause the electronic device to:

create a story album associated with the first image group.

6. The electronic device of claim 5, wherein the instructions, when executed by the processor, cause the electronic device to:

determine a name of the story album associated with the first image group based on a place name of the first images included in the first image group.

7. The electronic device of claim 1, wherein the instructions, when executed by the processor, cause the electronic device to:

identify at least one first place based on a photographing location of the first images; and identify the place information about the first images among the at least one first places thus identified, based on the at least one tag information.

8. The electronic device of claim 7, wherein the instructions, when executed by the processor, cause the electronic device to:

identifying at least one second places of the identified at least one first places other than the identified place information of the first images; and displaying a user interface indicating information about the second places.

9. The electronic device of claim 8, wherein the at least one second places are identified based on a conditional probability when visiting places according to the place information of the first images.

10. The electronic device of claim 8, wherein the at least one second places are identified based on tag information identified in common from the at least one image groups.

11. An operating method of an electronic device, the method comprising:

classifying at least one image stored in a memory into at least one image group, based on meta information stored with the at least one image;

identifying at least one tag information of at least one object of first images included in a first image group of the at least one image group with a processor;

identifying place information about the first images, based on the at least one tag information; and correcting meta information of the first images, based on the identified place information.

12. The method of claim 11, wherein images respectively classified into the at least one image groups have continuity with each other, and wherein the continuity includes time continuity and/or distance continuity.

13. The method of claim 11, wherein the identifying of the place information about the first images includes:

identifying the place information about the first images based on tag information having at least a specified confidence.

14. The method of claim 11, wherein the meta information includes a place name, a location, a place category, tag information matched with the place category, or a combination thereof.

15. The method of claim 11, further comprising:

creating a story album associated with the first image group.

16. The method of claim 15, wherein the creating of the story album associated with the first image group includes:

determining a name of the story album associated with the first image group based on a place name of the first images included in the first image group.

17. The method of claim 11, wherein the identifying of the place information of the first images includes:

identifying at least one first places based on a photographing location of the first images; and identifying the place information about the first images among the at least one first places thus identified, based on the at least one tag information.

18. The method of claim 17, further comprising:

identifying at least one second places of the identified at least one first places other than the identified place information of the first images; and displaying a user interface indicating information about the second places.

19. The method of claim 18, wherein the at least one second places are identified based on a conditional probability when visiting places according to the place information of the first images.

20. The method of claim 18, wherein the at least one second places are identified based on tag information identified in common from the at least one image groups.

* * * * *